United States Patent [19]

Nicholas

[11] 4,161,464

[45] Jul. 17, 1979

[54] DEVULCANIZED RUBBER COMPOSITION AND PROCESS FOR PREPARING SAME

[75] Inventor: Paul P. Nicholas, Broadview Heights, Ohio

[73] Assignee: The B. F. Goodrich Company, Akron, Ohio

[21] Appl. No.: 889,999

[22] Filed: Mar. 24, 1978

[51] Int. Cl.$^2$ .................. B29H 19/00; C08C 2/06
[52] U.S. Cl. .................. 260/2.3; 260/567.6 M; 260/606.5 F; 260/607 B
[58] Field of Search .......... 260/2.3, 567.6 M, 606.5 F, 260/607 B; 526/27, 33, 52.1

[56] References Cited

U.S. PATENT DOCUMENTS

| | | | |
|---|---|---|---|
| 2,415,449 | 2/1947 | Sverdrup et al. | 260/720 |
| 2,633,602 | 4/1953 | Sverdrup et al. | 18/14 |
| 2,653,348 | 9/1953 | Elgin et al. | 18/12 |
| 2,653,915 | 9/1953 | Elgin et al. | 260/2.3 |
| 2,804,651 | 9/1957 | Peterson | 18/48 |
| 3,051,990 | 9/1962 | Peterson | 18/14 |
| 4,046,834 | 9/1977 | Lee et al. | 260/852 |
| 4,104,205 | 8/1978 | Novotny et al. | 260/2.3 |

OTHER PUBLICATIONS

Jour. Poly. Sci., XIX, 237–254 (1956).
Reclaiming Synthetic Rubber, Kilbourne, in *Rubber Age*, Feb. 1949, pp. 581 ff.
Conover, in *Rubber Age*, Jun. 1945, pp. 308 ff.
Chem. Abs., 31:P6503(8), 36:2755, 36:P2756(6).

*Primary Examiner*—Thomas DeBenedictis
*Attorney, Agent, or Firm*—James R. Lindsay

[57] ABSTRACT

A devulcanized rubber composition is disclosed which is obtained by low temperature phase transfer catalyzed devulcanization of commercial scrap rubber, such as a vulcanized polyisoprene rubber, butadiene-styrene rubber, cis-polybutadiene rubber used for vehicle tires. The devulcanized rubber of this invention is distinguishable from conventional reclaim rubber in that devulcanized rubber is substantially free of polysulfide crosslinks which are selectively broken during the process of this invention with negligible main chain scission.

A process for devulcanization of scrap rubber is disclosed comprising (a) comminuting the scrap to obtain vulcanizate particles in the size range from about 325 U.S. Standard mesh (44 microns) to about 6 mesh (3.36 mm), (b) swelling the vulcanizate particles with an organic solvent having dissolved therein a predetermined concentration of an onium salt, and (c) contacting the vulcanizate particles, at a temperature below about 150° C., with an aqueous solution containing OH$^-$ ions to selectively disrupt enough polysulfide crosslinks to produce a devulcanized, recyclable rubber.

19 Claims, 3 Drawing Figures

DEVULCANIZED RUBBER COMPOSITION AND PROCESS FOR PREPARING SAME

BACKGROUND OF THE INVENTION

The reclaim rubber industry is an old one, founded mainly upon the alkali process in which ground polyisoprene rubber scrap was cooked in aqueous sodium hydroxide (NaOH) at about 190° C. for many hours. Aqueous sodium hydroxide dissolved the residual fiber and any sulfur that diffused to the surface. The concurrent softening of the rubber is attributable chiefly to thermal oxidative main chain scission. The extreme incompatibility of aqueous NaOH with rubber minimizes the participation of NaOH in the scission of polysulfide crosslinks, such as may occur. Moreover, natural rubber vulcanizates could be reclaimed even through the application of heat alone. The alkali process was abandoned with the advent of butadiene-styrene rubber because of "heat hardening" of SBR vulcanizates under these conditions.

Three processes, popularly referred to as the digester process, the heater process, and, the reclaimator process, currently produce essentially all the reclaim rubber (referred to for brevity herein as "reclaim") in the U.S. Scrap rubber in these processes is reclaimed through the application of high temperatures and intense working, that is, the application of severe mechanical shear. The rubber is first ground, defibered, and mixed with depolymerization chemicals. In the heater and reclaimator process, this mixture is heated at high temperatures for prolonged periods followed by the application of intense working. Network destruction occurs mainly through the breaking of bonds in the main polymer chain; although, some sulfide crosslinks are also likely broken. Depolymerization chemicals assist this process, probably through free radical chain transfer reactions. Though oxygen is not deliberately added, enough must be present to enable oxidation processes to occur. The reclaimator process disclosed in U.S. Pat. Nos. 2,415,449; 2,633,602; 2,653,348; 2,653,915; 2,804,651; and 3,051,990 inter alia, differs in that it is carried out in an extruder where both heat and shear are applied simultaneously. The structure of the resulting reclaim is characteristically a branched three-dimensional network of shortened polymer chains. Such reclaim bears little resembalance to the original rubber from which the reclaim was derived. This dissimilarity of reclaim is reflected in low tensile strength, poor abrasion resistance, and poor dynamic properties of cured rubber compounds containing a significant quantity of reclaim. These currently used prior art processes are thermomechanical methods which cause indiscriminate network destruction, most of which is hydrocarbon main chain scission. As a result, conventional reclaim is normally used only in small amounts in most tire rubbers. (see *Scrap Tire Disposal*, Beckman, J. A. et al, Rubber Chem. Techol. 47 (3), 597 (1974)).

An effort to produce a recyclable reclaim rubber without altering its network structure is disclosed in U.S. Pat. No. 4,046,834 to Lee, T. C. and Millns, W. In one process disclosed therein, shredded coarse crumbs of scrap rubber absorb a fatty acid and are dusted with solid alkali. The rubber is rolled on a mill, comminuted, dispersed in an aqueous mixture and recovered as a sub-20 micron powder. In another process disclosed in the Lee et al patent, the vulcanized rubber crumb is swelled with an organic water-miscible liquid and comminuted to a sub-20 micron particle size in a liquid medium from which a dry reclaim rubber fine powder is obtained. The aforementioned Lee et al process is clearly a particle size reduction process in which NaOH, as stated therein, does not alter the network structure.

It is known that hydroxide ions ($OH^-$) chemically break polysulfide bonds in simple organic molecules. Though prior art processes have cooked comminuted vulcanized rubber scrap in hot sodium hydroxide the purpose was mainly to remove fiber. To utilize this polysulfide bond-breaking chemistry of $OH^-$ ions effectively, it is necessary to penetrate the heretofore impregnable elastomeric networks in vulcanized scrap with $OH^-$ ions at relatively low temperatures compared to those normally used in reclaim processes. If accomplished, this should yield a devulcanized rubber which, irrespective of what it is termed, is chemically distinguishable from prior art reclaim rubbers. The essential chemical distinction is that in devulcanized rubber, nearly all of the polysulfide crosslinks are selectively broken without significant main chain scission. An accepted definition of devulcanized rubber is that "It requires only that vulcanized rubber lose its elastic properties and become less resistant to compression, stretching, or swelling." ("Reclaim Rubber" by Bobby LaGrone, U.S. Rubber Reclaim Corp., in a presentation at the B. F. Goodrich Company in Akron, Ohio on Apr. 13, 1977). In other words, devulcanized rubber is more plastic than vulcanized rubber from which it is derived. However, I refer to "devulcanized rubber" which in addition has had a substantial proportion of polysulfide crosslinks broken by chemical means with negligible main chain scission. Though selective scission of polysulfide crosslinks has been achieved in other ways, most of these methods are not commercially practical, though they are useful for analytical purposes. For example, $LiAlH_4$ and $C_6H_5Li$ have been used to cleave polysulfide crosslinks when swollen into rubber with an anhydrous organic solvent.

The organic onium salts of nitrogen, phosphorus and sulfur are well known. They are ionized in aqueous solutions to form stable cations. Certain onium salts have provided the basis for phase transfer catalysis in a wide variety of reactions, a recent and comprehensive review of which is contained in Angewandte Chemie, International Edition in English, 16 493–558 (August 1977). Discussed therein are various anion transfer reactions where the onium salt exchanges its original anion for other anions in the aqueous phase. These ion pairs can then enter a water immiscible, organic liquid phase, making it possible to carry out chemistry there with the transported anion, including $OH^-$ ions. Many reactions involving water immiscible solutions of relatively simple organic molecules have been described. However, these mobile, liquid phase systems are quite distinct from the complex, immobile network structure of a scrap rubber particle, where the organic substrate is an insoluble, crosslinked polymer. To my knowledge, there is no teaching of phase transfer catalysis in a rubber vulcanizate for any purpose whatsoever, and no indication that this technology would be useful for the selective scission of polysulfide crosslinks in a rubber vulcanizate.

This invention discloses a phase transfer catalyzed devulcanization process which fills a long-felt need for coping with the twin problems of disposing of used tires responsibly, and, increasing the supply of hydrocarbon-derived raw materials.

SUMMARY OF THE INVENTION

It has been discovered that a phase transfer reaction catalyzed with certain onium salts allows the transport of $OH^-$ (hydroxide) ions into rubber vulcanizate particles at low temperatures to selectively cleave polysulfide crosslinks, producing a devulcanized rubber which is recyclable.

It is therefore a general object of this invention to provide a phase transfer catalyzed devulcanization process comprising comminuting scrap rubber to obtain vulcanizate particles smaller than about 6 U.S. Standard mesh (3.36 microns), swelling the vulcanizate particles with an organic solvent having dissolved therein a predetermined concentration of an onium salt, and thereafter contacting swollen vulcanizate particles, at a preferred temperature in the range from about 40° C. to about 100° C., with an aqueous solution of a base capable of providing sufficient $OH^-$ ions to selectively disrupt enough polysulfide crosslinks to produce a devulcanized rubber.

It is also a general object of this invention to provide a recyclable devulcanized rubber composition having a polysulfide crosslink density less than about one-half of that in the scrap rubber from which the devulcanized rubber is derived.

It is another general object of this invention to provide a reconstituted rubber composition comprising from about 10 to about 100 parts by weight (wt) of devulcanized rubber per 100 parts by wt of virgin rubber.

It has also been more specifically discovered that sulfur vulcanized scrap rubber particles, preferably about 30 U.S. Standard mesh (590 microns) or smaller, when swollen with a suitable solvent, may be devulcanized in the presence of aqueous sodium hydroxide and certain select substituted onium salts the molecular size of which is critical in that the total number of carbon atoms of all substituents in the onium salt is in the range from about 13 to about 57.

Other objects and advantages of the invention will be apparent from the following detailed description taken in conjunction with the drawings, described hereinbelow.

DETAILED DESCRIPTION OF PREFERRED EMBODIMENTS

Figure 1:
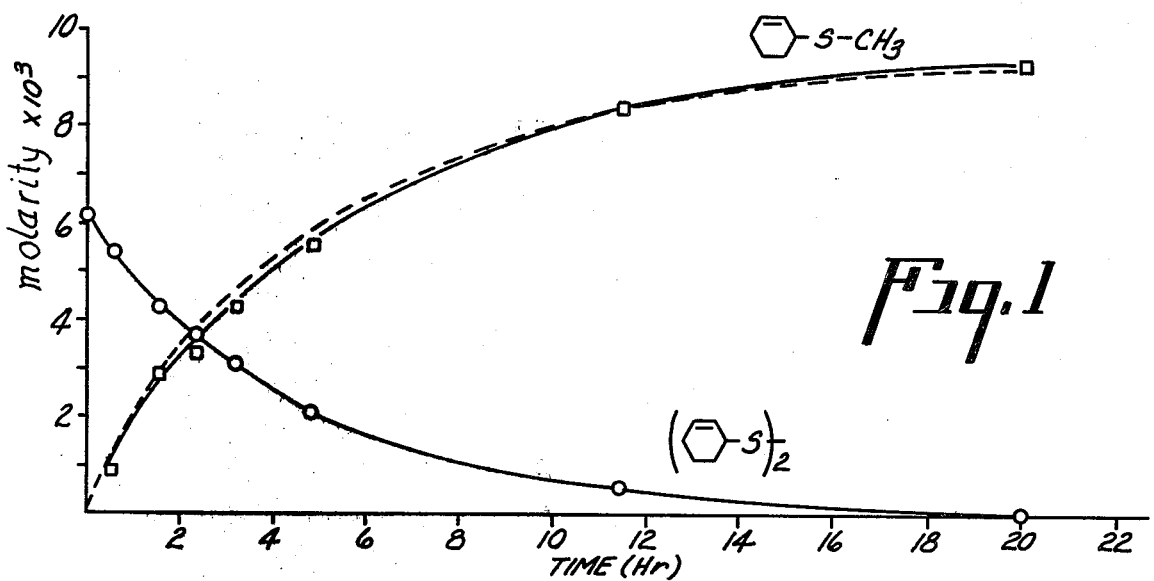
FIG. 1 is a graph in which is plotted molarity $\times 10^3$ of 3-cyclohexenyl disulfide and 3-cyclohexenyl methyl sulfide against time (hours), and for comparison, a dashed curve showing the theoretical concentration of the methyl sulfide which would be present if produced quantitatively from the disulfide. The quaternary ammonium salt used is N-methyl-N,N,N-tri-n-hexylammonium chloride.

This invention provides a relatively low temperature process for devulcanizing scrap rubber vulcanizate particles. It is based upon a chemical reaction which occurs in the presence of small quantities of certain select substituted onium salts. In this chemical reaction, swollen vulcanizate particles are attacked by $OH^-$ ions in a novel and surprisingly effective manner. These swollen particles, consisting essentially of a crosslinked elastomeric network including polysulfide crosslinks and compounding ingredients, some or all of which are bound to the elastomeric network, are individually and collectively subjected to selective scission of polysulfide crosslinks.

A preferred embodiment of this process is a simple one, comprising comminuting scrap vulcanized rubber into small particles in the size range smaller than about 6 U.S. Standard mesh, contacting the particles with an organic swelling solvent which has dissolved therein a preselected onium salt, and also with an aqueous alkali solution capable of providing $OH^-$ ions, and recovering devulcanized particles. The process is preferably carried out in a reaction mass consisting of crosslinked rubber particles swollen with an organic solvent in contact with an aqueous solution. It is preferred that the vulcanizate particles be in a swollen state to facilitate permeation by onium hydroxide ion pairs, but the order in which the particles are contacted with organic solvent to swell them, and aqueous solution containing $OH^-$ ions, for example aqueous NaOH, is not critical. Typically the organic solvent and aqueous NaOH are premixed, pumped into a stirred vessel containing the vulcanizate particles, and heated in the range from from about 40° C. to about 100° C. The organic solvent is essential to effectively swell the vulcanizate particles. By "effectively swell" is meant that the organic solvent swells the particles to a volume at least 20 percent greater than their original unswollen volume. Polysulfide crosslink scission then occurs rapidly. By "polysulfide" crosslinks I refer to disulfide and longer crosslinks, which will be more fully explained hereinafter with the aid of measurements of crosslink density.

In comparison, rubber hydrocarbon main chains are very long, and many of them are degraded in prior art processes by intense heating and mechanical working. There is negligible main chain degradation in this phase transfer catalyzed devulcanization process because, after the initial comminution of the rubber scrap into particles, there is no intense heating or mechanical working of the particles. It is the chemical action of $OH^-$ ions transported into the particles' elastomeric network by onium salts, that severs sulfur-to-sulfur bonds without severing hydrocarbon bonds, and this action is referred to as "polysulfide crosslink scission". The extent to which polysulfide crosslink scission occurs can be determined experimentally by the measurement of crosslink density by certain methods, one of which involves vapor phase swelling by a suitable organic solvent. It is found that the process of this invention breaks most of the polysulfide crosslinks as determined by comparison with known chemical probes, such as phenyl lithium, and also by experiments with other well characterized rubber vulcanizates containing either polysulfide or monosulfide crosslinks only.

Measurements of crosslink density by vapor phase swelling are made as follows: The average polymer composition in the scrap rubber particles was first determined. Approximately 1.4 g samples were extracted for 24 hours with 80–90 ml of benzene or cyclohexane. Clusters of rubber particles could easily be separated manually, if necessary. Most of the solution was then decanted off and the swollen rubber transferred to a tarred, seamless 3 oz aluminum can having a tight fitting lid. A copper screen, prepared from such a lid, is placed on the can, and the residual solvent is shaken out. The inverted can is then struck several times against absorbant paper towels to remove as much solvent as possible. The samples are then transferred to a vacuum oven and dried at 55° C. to constant weight (approx. 2 hr). After weighing, the cans are placed in a specially designed chamber containing liquid benzene and vapor swollen to equilibrium at 25.5° C. The swollen weights are then determined. They are then dried in a vacuum oven and analyzed for rubber, black, and ash using a pyrolytic method. A small adjustment for ash is made, and the volume fraction of rubber and black in the swollen samples can be calculated. Approximate chemical crosslinks densities are calculated using the Flory-Rehner equation (P. J. Fory and J. Rehner, Jr., J. Chem. Phys., 11, 512,521, (1943)), and the Moore-Watson calibration curve for relating physical crosslinks density to chemical crosslink density (C. G. Moore and W. F. Watson, J. Polymer Sci, 19, 237 (1956); L. Mullins, J. Appl. Polymer Sci, 2 1 (1959). Adjustment for carbon black is made using Porter's method (M. Porter, Rubber Chem. Technol. 40, 866 (1967); see also L. Bateman, Ed., *The Chemistry and Physics of Rubber-like Substances*, Maclaren & Sons, London, John Wiley & Sons, New York, 1963, p. 464). Since the molecular weights of the polymer components are unknown, reasonable values are assumed. There are certain assumptions made in the application of these equations. Therefore, the absolute values for the chemical crosslink densities must be considered only approximate. However, these data are internally consistent, and relative values are especially meaningful.

Onium salts of nitrogen, phosphorus and sulfur having certain structural limitations set forth hereinafter, may be used in which the salt has the formula $R_nY^+X^-$, wherein Y is selected from N, P and S, and n is an integer which may be 3 or 4; when Y is N or P, n=4, and when Y is S, n=3. R represents either different or identical monovalent organic radicals bonded to Y by covalent linkages, and $X^-$ is a counterion. In an analogous manner, onium salts having certain multivalent organic substituents may be useful in this invention. Examples include multivalent organic radicals that incorporate Y in a ring, and those that are bonded to more than one Y.

The preferred onium salts for use in the invention have the formula $(R^1R^2R^3R^4Y^+)X^-$ wherein Y is N or P, and $R^1$–$R^4$ are monovalent hydrocarbon radicals preferably selected from the group consisting of alkyl, alkenyl, aryl, alkaryl, aralkyl, and cycloalkyl moieties or radicals, optionally substituted with suitable heteroatom-containing functional groups. The total number of carbon atoms in $R^1$, $R^2$, $R^3$, and $R^4$ cumulatively range from about 13 to about 57, and preferably range from about 16 to about 30. More than about 57 carbon atoms in the molecule make it too large to be effective in this reaction.

Most preferred onium salts have Y=N, and hydrocarbon radicals where $R^1$ is $CH_3$, and $R^2$, $R^3$, and $R^4$ are each selected from the group consisting of n-$C_4H_5$; n-$C_5H_{11}$; mixed $C_5H_{11}$; n-$C_6H_{13}$; mixed $C_6H_{13}$; $C_6H_5$; $C_6H_5CH_2$; n-$C_8H_{17}$; n-$C_{12}H_{25}$; n-$C_{18}H_{37}$; mixed $C_8$-$C_{10}$ alkyl; and the like. However, $R^1$ may also be selected from $C_2H_5$, n-$C_3H_7$ and n-$C_4H_9$.

Various counterions may be used, including $Cl^-$, $Br^-$, $I^-$, $NO_3^-$, $SO_4^=$, $HSO_4^-$ and $CH_2CO_2^-$. Most preferred is $Cl^-$.

In addition to the above-described specific structure of the onium salts, the amount of the salts used is in the range from about 0.001 mol to about 0.5 mol, and more preferably, for the usual practice of this invention, from about 0.03 to about 0.3 mol per kg of scrap rubber is used. Further, the onium salt should be soluble in the organic solvent such that the required amount of salt can be dissolved in the solvent volume needed to achieve maximum swell. Thus very little salt is required to effect the selective scission of nearly all polysulfide crosslinks in the vulcanizate when utilizing a solvent with a desirable swelling action. Though, relatively much higher concentrations of salt than 0.3 mole/kg rubber may be used, the economic incentive to use as little as possible to effect the desired scission, is obvious. As will be described hereinafter, the onium salt is consumed in the devulcanization reaction when using the preferred onium salt structure, $CH_3NR^2R^3R^4X$. Therefore the salt is not truly a catalyst in the strictest sense.

It is preferred that the organic solvent be an effective swelling agent for the rubber particles over a wide range of relatively low temperatures from about 20° C. to about 150° C., and preferably in the usual operating range of from about 40° C. to about 100° C. for this phase transfer catalyzed devulcanization. Of course, the solvent should be essentially inert under the conditions of the reaction, substantially immiscible with the aqueous phase, and be capable of effectively swelling the scrap rubber particles.

Preferred organic solvents which are suitable swelling agents are water immiscible hydrocarbons. Most preferred are common aromatic and paraffinic solvents such as benzene, p-xylene, toluene, chlorobenzene, cyclohexane, and the like.

In carrying out the process of this invention, it is necessary that the rubber be in the form of particles. The precise size of the particles is not critical so long as they are small enough to be adequately devulcanized in a predetermined period of time. By "adequately devulcanized" we refer to a composition which, when incorporated into a virgin masterbatch, yields a vulcanizate which has superior physical properties, particularly abrasion, modulus, and hysterisis, compared with those obtained with a comparable weight of reclaim or ground scrap. From a practical point of view, particles larger than about 6 mesh are too large to be adequately devulcanized economically. It is desirable to comminute the particles to as small a size as practical. However, particles smaller than about 325 mesh (44 microns) are not easily obtained, though particles as small as 10 microns give excellent results. A preferred operating size range is from about 30 mesh to about 100 mesh.

Though pressure is not critical, for economic reasons, ambient pressure, or relatively low pressures less than about 5 atmospheres are preferred, and very low boiling solvents are generally not desirable. The efficacy of crosslink scission with a particular solvent will vary depending upon its capacity to swell the rubber particles and also on the concentrations of alkali and onium salt. The preferred maximum temperature at which the process may be operated is one at which the desired crosslink breaking chemistry, that is, severing polysulfide bonds, occurs at a faster rate than the rate at which destruction of the onium salt occurs because of undesirable side reactions at the elevated temperature. Generally, maximum polysulfide crosslink scission is obtained in about one to about five hours and usually in about two to three hours at 70° C.–80° C. when using the optimum concentrations of reactants and an effective swelling agent such as toluene or benzene.

It is preferred that the devulcanization reaction of this invention be carried out in the presence of an organo chloride alkylating agent, preferably a common one such as benzyl chloride or methyl chloride, to improve the efficiency of the devulcanization. The precise manner in which this occurs is not fully clear, but will be demonstrated by evidence presented hereinbelow.

The following experiments were designed to identify the chemical structure of the broken polysulfide crosslinks following devulcanization. Specifically described here is the chemistry that occurs when using the preferred ammonium salts of this invention, $R^2R^3R^4N^+—CH_3Cl^-$.

It is known from simple, small molecule chemistry that organo disulfides undergo the following reaction with hydroxide ion as follows:

$$2R—S—S—R + 4OH^- \rightarrow 3RS^- + RSO_2^- + 2H_2O \quad (1)$$

where R is a simple organic radical.

In the following model experiments, it is evident that an analogous reaction occurs between a simple model of a disulfide crosslink and transported hydroxide ions. With scrap rubber, R would be a polymer molecule. These experiments further demonstrate the fate of the thiolate ion RS$^-$, which is now found to be unstable in this system.

It is most difficult to study quantitatively the chemistry of crosslinks in scrap rubber. This is mainly because (a) polysulfide crosslinks are present to the extent of only about $10^{-4}$ to about $10^{-5}$ M, and, (b) they are bound in a complex particle structure. For this reason, a simple model of the disulfide crosslink in cis-1,4-polybutadiene was synthesized and its chemistry studied by liquid chromatography under the conditions of this process. The model chosen for this study was 3-cyclohexenyl disulfide (I). It has the disulfide linkage allylic to the cis - double bond in general agreement with the crosslink structure in accelerated sulfur vulcanizates (L. Bateman, Ed., supra, p. 451). "Devulcanization" was carried out at $6.6 \times 10^{-3}$M of disulfide in benzene using 2.1 N NaOH and 0.020 M quaternary ammonium salts, $R^2R^3R^4N^+CH_3Cl.^-$ The results are graphically illustrated in FIGS. 1 and 2. They clearly show that the thiolate ion is unstable and rapidly converts to 3-cyclohexenyl methyl sulfide II (see equation 2) with stoichiometry expected from eqn. (1)

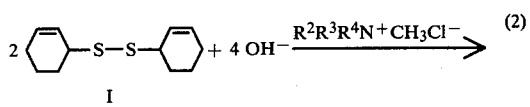

(2)

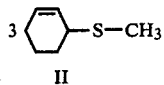

II

This occurs by demethylation of the quaternary ammonium ion as shown in equation (3) as follows:

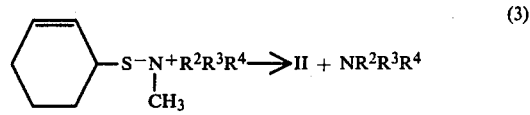

(3)

Figure 2:
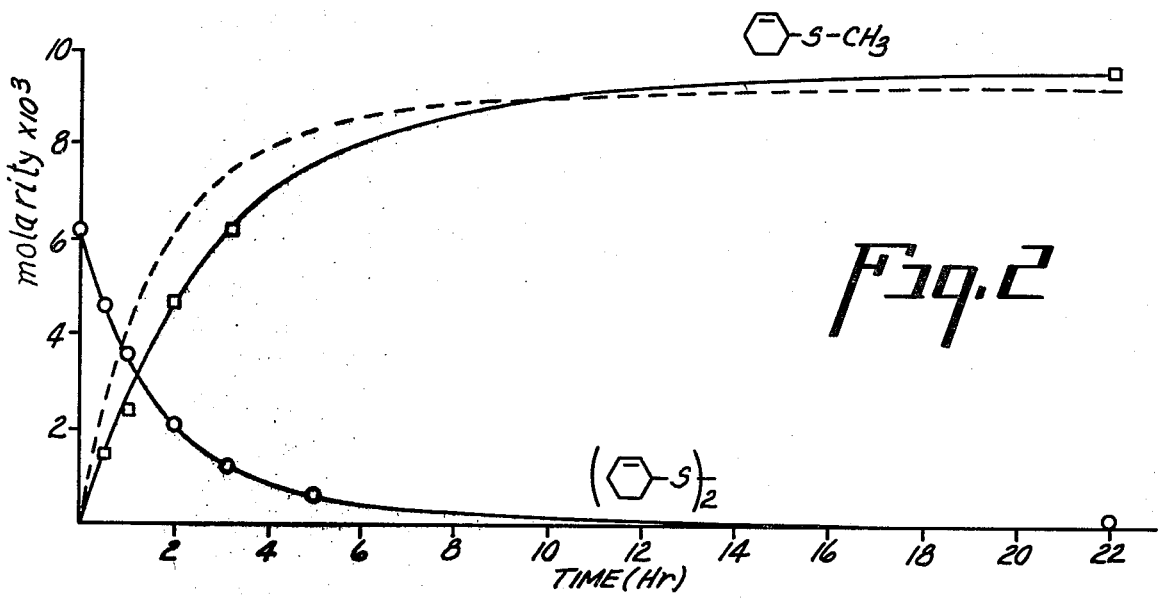
FIG. 2 is a graph in which is plotted molarity $\times 10^3$ of 3-cyclohexenyl disulfide and 3-cyclohexenyl methyl sulfide against time (hours), and for comparison, a dashed curve showing the theoretical concentration of the methyl sulfide which would be present if produced quantitatively from the disulfide. The quaternary ammonium salt used is N-methyl-N,N,N-tri($C_8$-$C_{10}$ mixed alkyl) ammonium chloride.

Some examples of this type of demethylation have been reported. (M. Shamma, N. C. Deno, and J. F. Remar, Tetrahedron Lett., No. 13, 1375 (1966). Note in FIGS. 1 and 2 herein, that only methyl transfers, and that there is no detectable sulfide formed from transfer of alkyl substituents $R^2$–$R^4$. Moreover, the reaction is essentially quantitative. The broken curves in FIGS. 1 and 2 are theoretical ones, representing the amount of methyl sulfide II which would form if it were produced quantitatively from converted disulfide I by equation (2). Therefore, the general reaction shown in equation (1) also applies to this system with the added feature that the thiolate ion RS$^-$ is only a transient intermediate which rapidly converts to the methyl sulfide. This, of course, means that methyl quaternary ammonium salts are not, strictly speaking, catalysts in this devulcanization process because they are consumed during the reaction.

Figure 3:
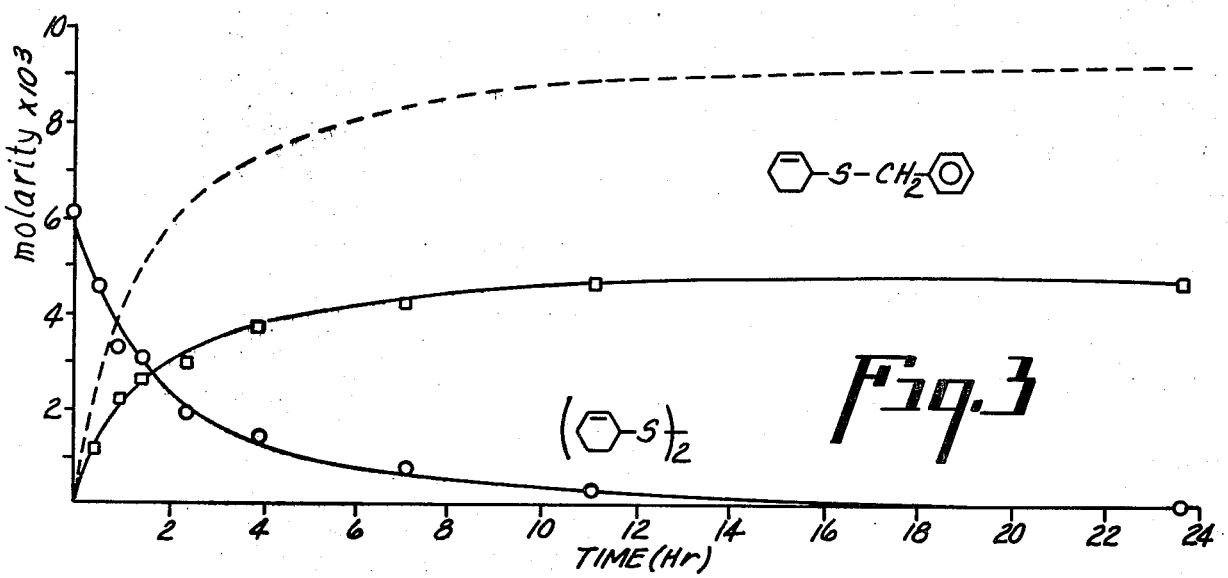
FIG. 3 is a graph in which is plotted molarity $\times 10^3$ of 3-cyclohexenyl disulfide and benzyl 3-cyclohexenyl sulfide against time (hours), and for comparison, a dashed curve showing the theoretical concentration of the benzyl sulfide which would be present if produced quantitatively from the disulfide. The quaternary ammonium salt used is N-methyl-N,N,N-tri($C_8$-$C_{10}$ mixed alkyl) ammonium chloride.

When an organo chloride alkylating agent, R'—Cl, is added, it competes with the quaternary ammonium ion for alkylation of the thiolate ion. For example, with 2% v/v benzyl chloride (R'=PhCH$_2$), the formation of methyl sulfide is completely supressed and benzyl sulfide forms instead, as graphically illustrated in FIG. 3. The organo chloride alkylating agent, therefore, minimizes catalyst destruction by the demethylation reaction, equation (3).

The foregoing is evidence that disulfide crosslinks are converted to methyl sulfides III and sulfinate IV when quaternary ammonium salts $R^2R^3R^4N^+CH_3Cl^-$ are used in this process as shown in equation (4), where R$_p$ is now a polymer radical.

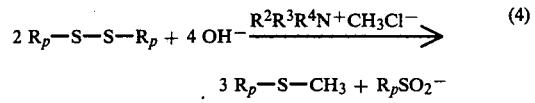

(4)

Furthermore, when an organo chloride alkylating agent, R'Cl, is present, the sulfide R$_p$—S—R' (V) is also formed in addition to III and IV. The relative amounts of III, IV and V formed will depend on the nature of the alkylating agent and the amount of the agent used. Of course, when R'=CH$_3$, structures III and V are identical. Higher polysulfide crosslinks, R$_p$—S$_n$—R$_p$ wherein n is greater than 2, give the same products after loss of intervening S atoms through displacement reactions.

EXAMPLES 1–7

The following examples illustrate the invention on an experimental scale using a commercially available ammonium salt, Aliquat 336 (N-methyl-N,N,N-tri (mixed C$_8$-C$_{10}$ alkyl) ammonium chloride) obtained from General Mills Chemicals. Scrap rubber used is 30-60 mesh vulcanizate peelings with the following average composition (benzene extracted prior to analysis): rubber, 58%; carbon black, 38%; ash, 3.6%, sulfur, 1.62%; rubber type polyisoprene/poly(butadiene-styrene)/polybutadiene=59/22.5/18.5; poly(butadiene-styrene) composition, 18% styrene.

A 3-neck, 250 ml flask was fitted with a water cooled condenser and paddle stirrer. It was charged with 10 g of 30-60 mesh scrap rubber particles. A solution of phase transfer catalyst in 50 ml of benzene was then added and the mixture slowly stirred while heating to reflux. Aqueous sodium hydroxide solution was then added and the mixture rapidly stirred at reflux for two hours. The mixture was cooled, stirred in water for 10–15 min, and filtered. Washing was repeated until the pH of the wash water was about 7-8. The rubber was dried in a vacuum oven overnight at 55° C. The results are set forth in Table I hereinbelow.

| Ex. No. | Quaternary Salt Aliquat* 336 | | NaOH conc (N) | Chemical Crosslink Density (mol/g rubber hydrocarbon) $\times 10^5$ |
|---|---|---|---|---|
| | g | mol $\times 10^4$ | | |
| 1 | 0.00 | 0.00 | 16.8 | 3.9 |
| 2 | 0.19 | 3.8 | 2.1 | 3.0 |
| 3 | 0.38 | 7.6 | 2.1 | 2.6 |
| 4 | 0.56 | 11. | 2.1 | 2.2 |
| 5 | 0.75 | 15. | 2.1 | 1.6 |
| 6 | 1.13 | 22.5 | 2.1 | 1.6 |
| 7 | Original scrap, untreated | | | 3.9 |

*Registered U.S. Trademark

It is evident that in the absence of a catalyst, a sample of vulcanizate treated with relatively strong aqueous alkali (16.8 normal) has essentially the same crosslink density as an untreated sample (original) of the scrap rubber. The samples treated with a small amount of quaternary salt dissolved in a swelling agent and in the presence of aqueous alkali (2.1 N) have substantially lower crosslink densities.

EXAMPLES 8-14

The following examples illustrate that common water immiscible aromatic and paraffinic hydrocarbon solvents are most preferred swelling agents. The reactions were carried out as described in Example 1 above using 0.75 g of Aliquat 336 and 2.1N NaOH, and measurement of the chemical crosslink density of each sample is made on the treated rubber particles recovered.

TABLE II

| Ex. No. | Swelling agent | Chemical Crosslink Density (mol/g rubber hydrocarbon) $\times 10^5$ |
|---|---|---|
| 8 | Benzene | 1.6 |
| 9 | p-Xylene | 1.5 |
| 10 | Chlorobenzene | 1.4 |
| 11 | Cyclohexane | 1.8 |
| 12 | Toluene | 1.4 |
| 13 | None* | 3.0 |
| 14 | Orig. scrap rubber | 3.9 |

*organic solvent replaced with an equal volume of aqueous sodium hydroxide solution.

It is evident that a substantial reduction in crosslink density is obtained which is not highly sensitive to the choice of the above good solvents.

EXAMPLES 15-26

Catalyst efficiency can sometimes be improved through the use of certain organo chloride alkylating agents, for example, R'—CH$_2$Cl, where R' is H, alkyl, aralkyl or alkenyl moieties containing no H on a saturated carbon atom beta to Cl. Benzyl chloride (R'=Ph) and lower alkyl and alkenyl chlorides having from one to about six carbon atoms, for example, methyl chloride (R'=H), are preferred alkylating agents. The following data, set forth in Table III hereinbelow, are derived from vulcanizate samples such as are used in Example 1, using an analogous procedure described therein, but reacted over a period of 5 hr, where 20% v/v benzene is replaced with benzyl chloride.

TABLE III

| Ex. No. | Quaternary Salt Aliquat* 336 (g) | Chemical Crosslink Density (mol/g rubber hydrocarbon) $\times 10^5$ | |
|---|---|---|---|
| | | No benzyl chloride | With benzyl chloride |
| 15 | 0 | 3.9 | 3.4 |
| 16 | 0.19 | 3.0 | 1.5 |
| 17 | 0.38 | 2.6 | 1.3 |
| 18 | 0.75 | 1.6 | 1.0 |

*Registered U.S. Trademark

Other examples under varying experimental conditions are set forth hereinbelow in Table IV. In those examples where methyl chloride was used, it was continuously passed through the apparatus starting from 15 min prior to the addition of aqueous sodium hydroxide. Since it is a gas, its exact concentration in the reaction mixture is unknown. In all cases, 1.5×10$^{-3}$ mol of quaternary salt was used. Where benzyl chloride was used, it was at 2% v/v of the hydrocarbon solvent.

TABLE IV

| Ex. No. | Alkylating agent | Solvent | Time of reaction(hr) | Chemical crosslink density (mol/g rubber hydroc.) $\times 10^5$ |
|---|---|---|---|---|
| 19 | Benzyl chloride | Benzene | 5 | 1.1 |
| 20 | None | Benzene | 5 | 1.6 |
| 21 | Benzyl chloride | Toluene | 2 | 1.1 |
| 22 | Methyl chloride | Toluene | 2 | 1.2 |
| 23 | None | Toluene | 2 | 1.4 |
| 24 | Benzyl chloride | p-xylene | 2 | 1.0 |
| 25 | Methyl chloride | p-xylene | 2 | 1.0 |
| 26 | None | p-xylene | 2 | 1.5 |

EXAMPLES 27-29

To demonstrate the selectivity of this process and its application to the important tire rubbers, the reaction was carried out on three well characterized gum vulcanizates, each containing a different rubber. These were prepared from cis-1,4-polybutadiene (BR), poly(butadiene-styrene) (SBR), and cis-1,4-polyisoprene (IR), and cured with a system which introduced essentially all polysulfide crosslinks. The following compounds were mixed in a small Bandbury, cured into 10×12×0.125" sheets for 30 min at 135° C., then cryogenically ground. These vulcanizates dissolve nearly completely in a 2M solution of phenyllithium in anhydrous benzene, a well known analytical reagent for selectively cleaving polysulfide crosslinks (E. C. Gregg, Jr. and S. E. Katrenick, Rubber Chem. Technol., 43, 549(1970). These same vulcanizates were then devulcanized by the method of this invention.

| Recipe for Forming Polysulfide Crosslinks | |
|---|---|
| Ingredient | Weight(g) |
| Rubber | 100.0 |
| Zinc Oxide, ZnO | 3.0 |
| Diphenylguanadine | 0.75 |
| 2,2'-bis(benzothiazolyl)disulfide | 0.45 |
| 9,9-dimethylacridane | 1.00 |
| Sulfur | 1.25 |

Treatment of IR and SBR Vulcanizates: A 3-neck, 250 ml flask was fitted with a water cooled condenser and paddle stirrer. It was charged with 6.0 g of gum vulcanizate particles. A solution of 2.0 ml benzyl chloride and 0.75 g Aliquat 336 in 98 ml toluene was added, and the mixture heated to reflux with slow stirring. A solution of 2.0 g of NaOH in 24 ml of water was added, and the mixture was vigorously stirred at reflux for 24 hr. It was then cooled, the water layer removed, and the organic layer filtered through No. 100 copper screen (0.006" opening). The retained gel was dried in a vacuum oven at 40° C.

Treatment of BR Vulcanizate: The above described apparatus was charged with 2.5 g of rubber particles and 75 ml of benzene containing 0.39 g of Aliquat 336. The mixture was heated to reflux under nitrogen and a solution of 0.50 g of NaOH in 6.0 ml of water was added. The mixture was vigorously stirred at reflux. After 4½ hr., the reaction mixture became a somewhat viscous cement with little visual evidence of gel. Methyl iodide (5 ml) was injected and the mixture cooled to room temperature. The solution was first filtered through No. 100 copper screen and a second time through Whatman No. 41 filter paper (with great difficulty and frequent filter replacement). The combined weight of retained gel was 0.58 g (23%).

The results obtained by treatment of each of the vulcanizates are set forth in Table V hereinbelow.

TABLE V

| Ex. No. | Vulcanizate Treated | Amount Charged (g) | Amount Recovered (g) | % Insol Rubber |
|---|---|---|---|---|
| 27 | cis-1,4-polyisoprene (SN) | 6.0 | 5.50 | 92 |
| 28 | poly(styrene-butadiene) (SBR) | 6.0 | 2.42 | 42 |
| 29 | cis-1,4-polybutadiene (CB) | 2.5 | 0.58 | 23 |

In each of the foregoing cases, swell measurements showed that about 80% or more of the crosslinks were broken. It was assumed in these determinations that the chemical crosslink density of rubber soluble in benzene was zero. The molecular weight distribution of the soluble rubber from the CB vulcanizate was found to be similar to that obtained by phenyllithium devulcanization, as determined by gel permeation chromatography. Since phenyllithium is known to selectively cleave polysulfide crosslinks without polymer chain scission, it can be concluded that the chemistry of this invention has similar selectivity.

EXAMPLE 30

In the following example is set forth a larger scale devulcanization in pilot plant equipment, and the properties of the resulting rubber. A different lot of scrap rubber peelings was used in this experiment. It, too, was screened to 30-60 mesh and found to contain 12.5% of cyclohexane extractable components. The extracted rubber had the following average composition: rubber 61.3%; carbon black, b 33.9%; ash, 4.7%; sulfur, 1.44%; rubber type, polyisoprene/polybutadiene-styrene)/-polybutadiene=42.5/42.5/15; poly(butadiene-styrene) composition, 19% styrene. The chemical crosslink density was found to be $4.7 \times 10^{-5}$ mol/g rubber hydrocarbon.

A 5-gallon, stainless steel reactor was equipped with a gas inlet (with valve), a port for charging liquids and solids, a vent (with valve), and an agitator comprising two orthogonal blades mounted one above the other. The blades were pitched perpendicular to the rotational plane and extended to only a small distance from the reactor wall. The reactor was charged with 5.0 l of toluene containing 75.0 g of Aliquat 336. The solution was stirred at low speed while 1 kg of scrap rubber particles was added. The mixture was stirred for 40 min. The reactor was then swept with 0.1 lb of methyl chloride, the vent closed, and the reactor charged with 0.1 lb of methyl chloride. The mixture was stirred at 100 rpm for 15 min, then 15 lb of a solution comprising 600 g of NaOH/7.2 l of $H_2O$ was charged from a pressurized container. The agitator speed was increased to 210 rpm and the reaction mixture heated to 85° C. It was maintained at 81°-85° C. for 3 hr, then cooled to room temperature with the agitator speed reduced to 100 rpm. The mixture was washed several times with water and filtered, then vacuum dried overnight at 40° C. The chemical crosslink density was found to be $1.5 \times 10^{-5}$ mol/g rubber hydrocarbon, for approximately a 68% reduction from the original value.

EXAMPLES 31-33

The following new rubber masterbatch was prepared. Properties of a vulcanized masterbatch are set forth in Table VI hereinbelow, under Example No. 31. Various scrap rubbers were then blended into the masterbatch at 20% w/w, then cured at 150° C.

| Recipe for New Rubber Masterbatch | |
|---|---|
| Ingredient | Wt(g) |
| Oil Extended SBR (27.3% Oil) | 68.75 |
| Oil Extended CB (27.3% Oil) | 68.75 |
| ZnO | 5.00 |
| Stearic Acid | 1.50 |
| Carbon Black (1-ISAF-HS) | 75.00 |
| Aromatic Processing Oil | 8.75 |
| Dimethylheptylphenylenediamine | 1.50 |
| Diphenylamine-acetone Reaction Product | 1.00 |
| N-tert-butyl-2-benzothiazole sulfenamide | 1.20 |
| Sulfur | 2.00 |

The scrap rubbers used in these blends include (1) the original ground scrap from which the devulcanized rubbers are prepared, (2) reclaim rubber prepared from this same scrap by the Reclaimator Process, and (3)

devulcanized rubber prepared the process of this invention. Each rubber blend was evaluated, and the results are set forth in Table VI under examples 32-34 respectively.

TABLE VI

PHYSICAL PROPERTIES

| Ex. No. | Masterbatch SBR/BR 31 | 20% blends in Masterbatch | | |
|---|---|---|---|---|
| | | Ground Scrap 32 | Reclaim 33 | This Invention 34 |
| Tensile strength (psi) | 2670 | 1615 | 2025 | 2040 |
| 300% modulus (psi) | 1795 | 1160 | 890 | 1605 |
| % Elongation | 415 | 375 | 555 | 355 |
| Pico Abrasion Index[a] | 157 | 104 | 86 | 113 |
| BFG Flexometer ΔT(°F.)[b] | 58 | 89 | 110 | 58 |
| 70° C. Belt Flex (hr)[c] | 29 | 38 | 126 | 84 |

[a]ASTM D-2228, 4.5 kg load, 80 revolutions
[b]ASTM D-623, 100° C. and 143 psi, 17.5% stroke
[c]Time for growth of initiated flaw to twice (2 ×) original length see J. R. Beatty and A. E.. Juve, Rubber Chem. Technol. Vol. 38, 719 (1965).

I claim:

1. A process for devulcanization of scrap rubber comprising, (a) comminuting said scrap rubber to obtain vulcanizate particles small enough to be adequately devulcanized within a predetermined period of time, and, (b) contacting said vulcanizate particles with (i) an organic solvent having dissolved therein a predetermined concentration of an onium salt of an element, selected from the group consisting of nitrogen, phosphorus, and sulfur, and (ii) an aqueous solution containing a sufficient concentration of OH$^-$ ions to selectively disrupt enough polysulfide crosslinks to produce devulcanized rubber particles which contain less than about one-half the crosslink density of said scrap rubber from which said devulcanized rubber particles are derived.

2. The process of claim 1 wherein said vulcanizate particles are in the size range from about 6 to about 325 U.S. Standard mesh.

3. The process of claim 2 wherein said organic solvent is an effective swelling agent for said rubber and is essentially immiscible with water.

4. The process of claim 3 wherein said onium salt has the formula

$$R_nY^+X^-$$

wherein Y is selected from the group consisting of N, P and S; n is an integer which is 3 or 4; when Y=N or P, n=4; when Y=S, n=3, and R represnets either identical or different monovalent hydrocarbon radicals the total number of carbon atoms in which commulatively range from about 13 to about 57.

5. The process of claim 4 wherein contacting said vulcanizate particles with said organic solvent and said aqueous solution is effected at a relatively low temperature in the range from about 20° C. to about 150° C., at which temperature said polysulfide bonds are severed at a faster rate than the rate at which destruction of said onium salt occurs.

6. The process of claim 4 wherein $R^1$-$R^4$ is each selected from the group consisting of alkyl, alkenyl, aryl, alkaryl, aralkyl cycloalkyl, and each substituted with suitable heteroatom-containing functional groups.

7. The process of claim 4 wherein Y is selected from N and P, n=4, and, said monovalent hydrocarbon radicals are $R^1$, $R^2$, $R^3$, and $R^4$, wherein $R^1$=CH$_3$; $R^2$, $R^3$ and $R^4$ is each alkyl; and X=Cl, and said OH$^-$ ions selectively disrupt at least about 50 percent of said polysulfide crosslinks.

8. The process of claim 4 wherein Y is S, n=3, and said monovalent hydrocarbon radicals are $R^1$, $R^2$, and $R^3$ wherein $R^1$=lower alkyl having from 1 to about 5 carbon atoms; $R^2$ and $R^3$ is each alkyl; X=Cl; and said OH$^{31}$ ions selectively disrupt at least about 50 percent of said polysulfide crosslinks.

9. The process of claim 4 wherein said organic solvent is selected from the group consisting of aromatic and paraffinic hydrocarbon solvents.

10. The process of claim 4 wherein said onium salt is present in an effective amount less than about 0.3 mole per kg of said scrap rubber, which amount is sufficient to effect the desired disruption of polysulfide bonds and yield said devulcanized rubber particles.

11. The process of claim 6 wherein Y=N, and $R^2$, $R^3$, $R^4$ each has from about 5 to about 12 carbon atoms.

12. The process of claim 5 including in addition, contacting said vulcanizate particles and devulcanized rubber particles with an organo chloride alkylating agent.

13. The process of claim 6 wherein said organo chloride alkylating agent is represented by R'—CH$_2$Cl, where R' is selected from H, an alkyl, aralkyl and alkenyl moiety which does not contain H on a saturated carbon atom beta to Cl.

14. The process of claim 6 wherein said alkylating agent is selected from the group consisting of benzyl chloride, a lower alkyl chloride, and a lower alkenyl chloride having from 1 to about 6 carbon atoms.

15. A finely divided devulcanized rubber composition derived from scrap vulcanized rubber, said devulcanized rubber comprising polymeric sulfide derived from scission of polysulfides, said polysulfides being present in said devulcanized rubber in an amount less than 50 percent of the sulfur to sulfur bonds originally present in said scrap rubber, said polymeric sulfide being present in devulcanized rubber particles having a size smaller than about 6 U.S. Standard mesh.

16. The composition of claim 15 wherein said devulcanized rubber particles are further characterized by the presence of a trace quantity, less than about 1.6×10$^{-5}$ mol/gm rubber hydrocarbon of polysulfide crosslinks originally present in said scrap vulcanized rubber.

17. A devulcanized rubber composition produced by (a) comminuting vulcanized scrap rubber to vulcanizate particles smaller than about 6 U.S. standard mesh, and, (b) contacting said vulcanizate particles with (i) an organic solvent having dissolved therein a predetermined concentration of an onium salt of an element, selected from the group consisting of nitrogen, phosphorus, and sulfur, and (ii) an aqueous solution containing a sufficient concentration of OH$^-$ ions to selectively disrupt enough polysulfide crosslinks to produce devulcanized rubber particles.

18. A devulcanized rubber particle derived from a scrap rubber particle smaller than about 6 U.S. Standard mesh, said devulcanized rubber particle including a small quantity of polymeric sulfide represented by $R_p$—S—$CH_3$ wherein $R_p$ is a rubber polymer radical, and said sulfide is derived from the scission of polysulfide crosslinks in scrap rubber molecules $R_p$—$S_n$—$R_p$, wherein n is equal to or greater than 2.

19. The devulcanized rubber particle of claim 18 wherein said polymeric sulfide is generated in an amount of about 1.5 mole per mole of polysulfide crosslinks broken.